(12) United States Patent
Egg

(10) Patent No.: US 10,547,394 B2
(45) Date of Patent: Jan. 28, 2020

(54) QUAD BAND RELAY COMMON DATA LINK SYSTEM AND METHOD

(71) Applicant: Benjamin J. Egg, Manti, UT (US)

(72) Inventor: Benjamin J. Egg, Manti, UT (US)

( * ) Notice: Subject to any disclaimer, the term of this patent is extended or adjusted under 35 U.S.C. 154(b) by 5 days.

(21) Appl. No.: 16/035,042

(22) Filed: Jul. 13, 2018

(65) Prior Publication Data
US 2019/0140736 A1    May 9, 2019

Related U.S. Application Data

(60) Provisional application No. 62/531,881, filed on Jul. 13, 2017.

(51) Int. Cl.
| | |
|---|---|
| *H04B 7/185* | (2006.01) |
| *H04B 15/00* | (2006.01) |
| *H04B 1/10* | (2006.01) |
| *H04B 1/00* | (2006.01) |
| *H04B 1/04* | (2006.01) |
| *H04K 3/00* | (2006.01) |
| *G01S 1/30* | (2006.01) |
| *G05D 1/12* | (2006.01) |
| *G06F 21/60* | (2013.01) |
| *H04B 1/40* | (2015.01) |

(52) U.S. Cl.
CPC ............. *H04B 15/00* (2013.01); *G01S 1/302* (2013.01); *G05D 1/12* (2013.01); *G06F 21/602* (2013.01); *H04B 1/0071* (2013.01); *H04B 1/0475* (2013.01); *H04B 1/1081* (2013.01); *H04B 1/40* (2013.01); *H04B 7/1858* (2013.01); *H04B 7/18506* (2013.01); *H04B 7/18513* (2013.01); *H04B 7/18582* (2013.01); *H04K 3/44* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,053,983 A | * | 10/1991 | Hyatt | .................. B60R 16/0373 708/306 |
| 5,410,621 A | * | 4/1995 | Hyatt | .................. B60R 16/0373 382/260 |
| 5,912,966 A | * | 6/1999 | Ho | ........................... H04B 3/23 370/289 |

(Continued)

*Primary Examiner* — Khaled M Kassim
*Assistant Examiner* — Syed Ali
(74) *Attorney, Agent, or Firm* — Steven J. Malone; Malone IP

(57) ABSTRACT

A method of increasing reliability of a wireless radio includes: creating a first waveform at a first center frequency of an encoded data stream using a first wireless radio; creating a second waveform at a second center frequency of the encoded data stream using the first wireless radio; combining the first waveform and the second waveform into a composite waveform with redundant data streams at different center frequencies using the first wireless radio; wirelessly transmitting the composite waveform using the first wireless radio; wirelessly receiving the composite waveform; filtering the received composite waveform using a first filter band; digitizing the received composite waveform using the second wireless radio; demodulating the digitized composite waveform into a first data stream and a second data stream with the second wireless radio; and creating a third data stream representative of the encoded data stream.

6 Claims, 19 Drawing Sheets

(56) References Cited

U.S. PATENT DOCUMENTS

| | | | | |
|---|---|---|---|---|
| 6,069,913 A | * | 5/2000 | Suominen | H04L 7/042 |
| | | | | 375/147 |
| 2003/0076905 A1 | * | 4/2003 | Schetelig | H04L 7/042 |
| | | | | 375/343 |
| 2004/0105403 A1 | * | 6/2004 | Lin | H04B 7/18582 |
| | | | | 370/316 |
| 2006/0092865 A1 | * | 5/2006 | Williams | H04W 48/18 |
| | | | | 370/310 |
| 2011/0002371 A1 | * | 1/2011 | Forenza | H04B 7/0417 |
| | | | | 375/227 |
| 2014/0153674 A1 | * | 6/2014 | Stratigos, Jr. | H04L 27/06 |
| | | | | 375/340 |

* cited by examiner

QUAD BAND RELAY COMMON DATA LINK SYSTEM AND METHOD

RELATED APPLICATIONS

This application claims priority to U.S. Provisional Application Ser. No. 62/531,881 titled "High Speed Data Sampling For Filtering, Recreating GPS Signals, and High Speed Communications" filed on Jul. 13, 2017 which is hereby incorporated by reference, in its entirety, for all it teaches and discloses.

FIELD OF THE INVENTION

The present invention discloses a quad band, common data link radio system and method.

BACKGROUND

The Common Data Link (CDL) system is a communication system that suffers significant performance and reliability losses due to multipath interference and fading, particularly in low Angle of Arrival (AoA) operating conditions.

SUMMARY

A system and method of increasing reliability of a wireless radio communication includes: creating a first waveform at a first center frequency $f_0$ of an encoded data stream using a first wireless radio; creating a second waveform at a second center frequency $f_1$ of the encoded data stream using the first wireless radio; combining the first waveform and the second waveform into a composite waveform with redundant data streams at different center frequencies using the first wireless radio; wirelessly transmitting the composite waveform using the first wireless radio; wirelessly receiving the composite waveform; filtering the received composite waveform using a first filter band; digitizing the received composite waveform using the second wireless radio; demodulating the digitized composite waveform into a first data stream and a second data stream with the second wireless radio; and creating a third data stream representative of the encoded data stream using a combination of the first data stream and the second data stream using the second wireless radio.

The communication system may further comprise: creating a third waveform at a third center frequency $f_2$ of an encoded data stream using the first wireless radio, and creating a fourth waveform at a fourth center frequency $f_3$ of the encoded data stream using the first wireless radio. The communication system may further comprise wirelessly receiving the encoded data, with a third radio using a second filter band before the digitizing step.

The method may additionally include: creating a first waveform at a first center frequency $f_0$ of an encoded data stream using a first wireless radio; creating a second waveform at a second center frequency $f_1$ of the encoded data stream using the first wireless radio; creating a third waveform at a third center frequency $f_2$ of the encoded data stream using the first wireless radio, and creating a fourth waveform at a fourth center frequency $f_3$ of the encoded data stream using the first wireless radio; combining the first waveform, the second waveform, the third waveform, and the fourth waveform into a composite waveform with redundant data streams at different center frequencies using the first wireless radio; wirelessly transmitting the composite waveform using the first wireless radio; wirelessly receiving the composite waveform; filtering the received composite waveform using a first filter band; digitizing the received composite waveform using the second wireless radio; demodulating the digitized composite waveform into a first data stream, a second data stream, a third data stream and a fourth data stream with the second wireless radio; and creating a third data stream representative of the encoded data stream using a combination of the first data stream, the second data stream, the third data stream, and the fourth data stream using the second wireless radio;

The method may further comprise wirelessly receiving the encoded data stream, with a third wireless radio using a second filter band. The filter band may be a subset of the first filter band and the third wireless radio may decode the encoded data stream without using the first filter band. The method may further comprise subjecting the second wireless radio and the third wireless radio to multipath interference signals, low angle of arrival signals, and/or jamming signals to jam the encoded signal of the third wireless radio without jamming the encoded signal of the second wireless radio. The method may further comprise determining a line-of-sight condition for the third wireless radio and the second wireless radio. The method may further comprise choosing a specific satellite or aerial transmitter as the first wireless radio based on the determined line-of-sight conditions. The specific satellite or aerial transmitter may be chosen to keep the third wireless radio from receiving and decoding the encoded data stream. The method specific satellite or aerial transmitter may be chosen to allow both of the third wireless radio and the second wireless radio to receive and decode the encoded data stream.

The Common Data Link performance and reliability is improved via the Quad band Relay (QbR) upgrade of legacy hardware. Multipath interference and fading effects are reduced by employing frequency diversity and data redundancy. Previous critical fading that resulted in extended data loss and tracking loop-lock failures are significantly improved. The Quad band Relay architecture is an efficient hardware and digital signal processing (DSP) enhancement to legacy communication systems, The new waveform transmitted by an upgraded QbR-CDL radio is 100% legacy compatible, while simultaneously providing link diversity when coupled with an upgraded receiver. Frequency diversity is the optimal solution to mitigate multipath interference and fading because those impairments are functions of frequency.

Utilizing an efficient frequency diversity architecture, link-loss due to multipath is significantly reduced. This is due to the fact the multipath losses are frequency dependent, and QbR's redundant transmissions have offset frequency centers transmitting encoded versions of the original legacy waveform. Legacy systems communicate with QbR upgraded platforms seamlessly. Furthermore, QbR upgraded systems receive the same transmission and are able to extract additional link gains via processing.

A Quad band Relay utilizes available CDL bandwidth for diversity transmission of multiple legacy waveforms. Frequency diversity is the optimal solution to mitigate multipath interference and fading because those impairments are functions of frequency.

We approach a solution to improve CDL reliability using the frequency diversity method, while maintaining a strict adherence to legacy compatibility requirements. We logically review the several possible radio-version combinations to ensure valid legacy and diversity communications. Finally, we analyze performance for the three mission environments previously discussed—severe, moderate, and clear multipath channels. All analysis is performed using the br45 waveform; however, the br10.71 QbR upgrade is proportionally identical in implementation and performance.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings.

Figure 1:
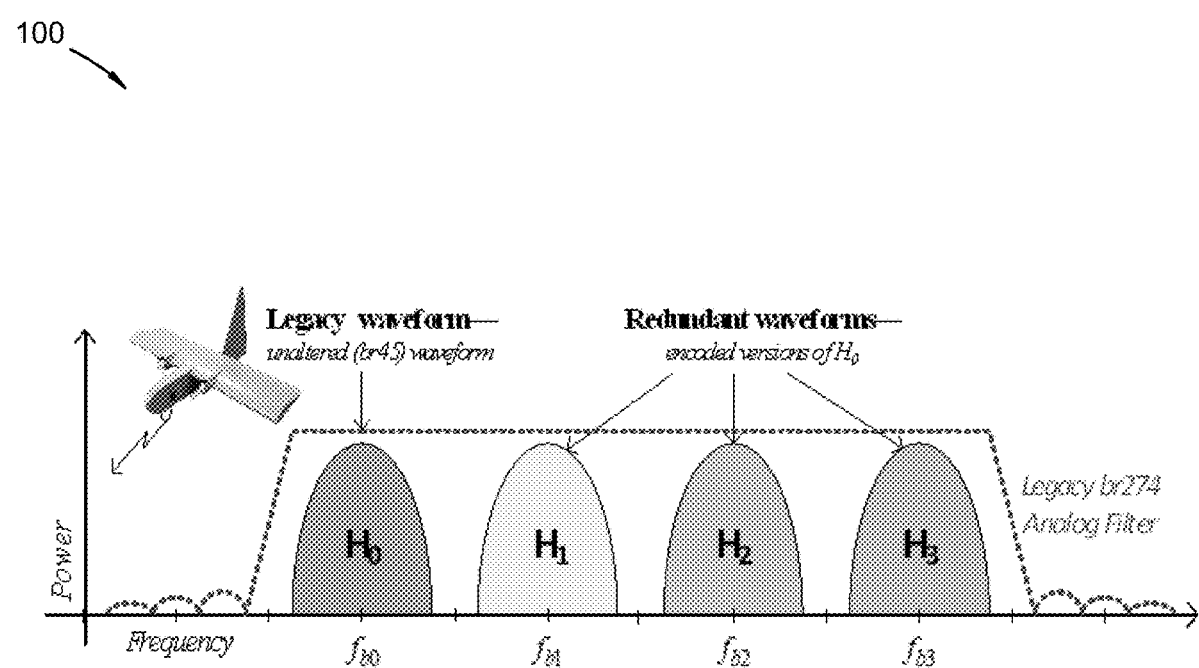
FIG. 1 shows a quad band relay example in accordance with an embodiment of the invention.

In FIG. 1, the power spectrum H0 centered at fb0, represents a legacy br45 waveform. The neighboring bandwidth is populated with 3 encoded versions of the legacy waveform—H1, H2, and H3. This bandwidth is generally unoccupied during legacy br45 operation; however, this QbR (quad-band relay) utilizes this available bandwidth to achieve diversity gain by modulating and channelizing (or up-converting) redundant versions of H0. The four spectrally offset waveforms now span the br274 filter bandwidth, with band centers—fb0, fb1, fb2, and fb3. Legacy and QbR upgraded CDL systems interoperate seamlessly. Furthermore, QbR upgraded systems may perform additional diversity gain processing when coupled with other upgraded systems. A legacy receiver's default br45 analog filter path rejects the out-of-band QbR waveforms [H1, H2, and H3], receiving only H0—a 100% legacy waveform. On the other hand, a QbR receiver's upgraded firmware selects the br274 filter path, allowing the legacy waveform and the three diversity encoded neighbors to be digitized, demodulated, and combined, resulting in one final br45 data stream. Deep fades (~40 dB) are mitigated via QbR's diversity path optimal combining of the 4 demodulated signals, resulting in 20 dB+ fade improvements.

Figure 2:
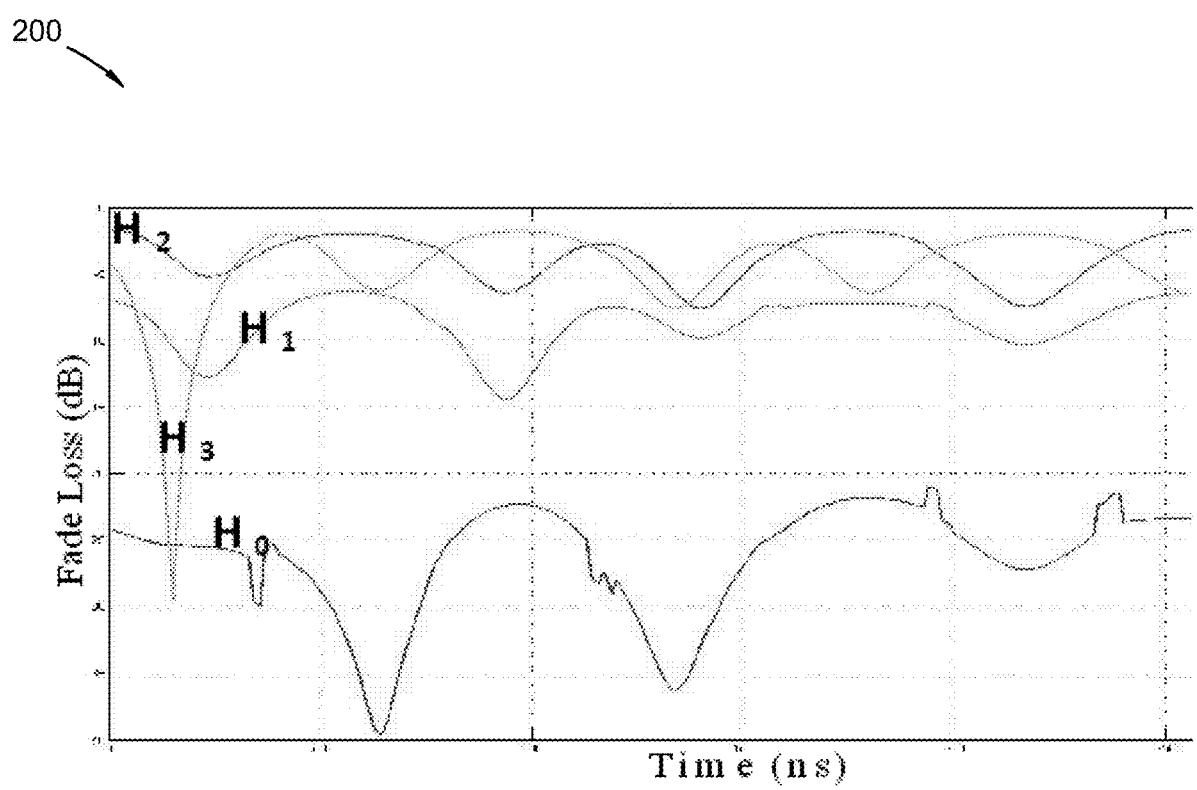
FIG. 2 shows a quad band relay example in accordance with an embodiment of the invention.

FIG. 2 illustrates the multipath fading of H0-H3. In this example, H2 experiences mild 6 dB fades, while H0 approaches −40 dB nulls. Simplistically, the combining algorithm "prefers" the mild fading of H2, resulting in 15 to 34 dB improvement over H0. In addition to link gains, the QbR upgrade is 100% legacy compatible, simultaneously operational. Utilizing an efficient frequency diversity architecture, link-loss due to multipath is significantly reduced. This is due to the fact the multipath losses are frequency dependent, and QbR's redundant transmissions have offset frequency centers transmitting encoded versions of the original legacy waveform. Legacy systems communicate with QbR upgraded platforms seamlessly. Furthermore, QbR upgraded systems receive the same transmission and are able to extract additional link gains via processing. An unmodified CDL system's default br45 filter bank rejects the redundancy of QbR, thus receiving a 100% legacy waveform. On the other hand, a QbR receiver's firmware selects the br274 filter path, allowing the legacy waveform and 3 diversity encoded waveforms to be digitized, demodulated, and combined into one final br45 data stream. Only the IF receiver filter bank selection changes, as far as the hardware is concerned. Upgrading the sea of current CDL hardware has been a key consideration in developing the QbR architecture, and the two enabling criteria which determine upgradability are: 1) The presence of a br274 filter path, and 2) sufficient processing power (FPGA size). The later requirement is likely satisfied if the system supports, or was originally designed to support the br274 waveform (regardless of br274 functionality). Beyond basic legacy support, the QbR architecture enables legacy activity while simultaneously providing QbR link diversity. This support for simultaneous link activity makes the QbR upgrade of legacy systems a low-risk/high-return win for the CDL community. QbR diversity performance gains are similarly achieved in br10.71 links.

Differences between radios that receive legacy signals and radios that receive composite QBR signals may be used as a tool to selectively communicate with a selected radio based on line-of-sight, multi-path fading characteristics, and angle of arrival characteristics. A radio transmitter source may be chosen to communicate with both a legacy radio system and a composite QBR system or with just the QBR system based a positioning of the radio transmitter source or a selection of a satellite source or other aerial vehicle radio transmission source.

Figure 3:
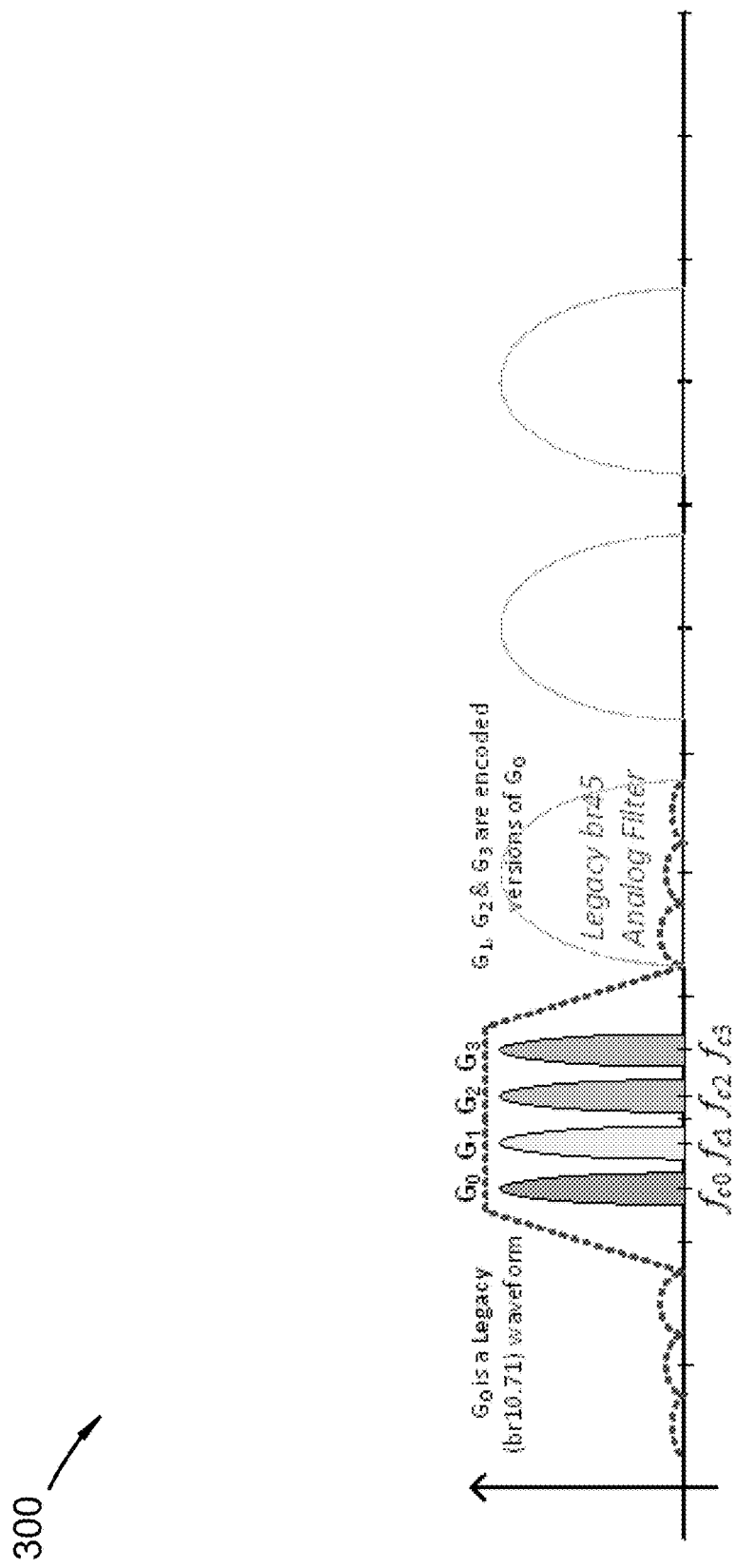
FIG. 3 shows a quad band relay example in accordance with an embodiment of the invention.

In FIG. 3, gains can be (proportionally) extended to br10.71 waveforms, using the br45 analog filter bank to support the additional bandwidth. In other words, just as QbR distributes 4 encoded version of a br45 waveform within a br274 filter bandwidth, four encoded br10.71 waveforms can similarly be distributed within a br45 bandwidth.

Figure 4:
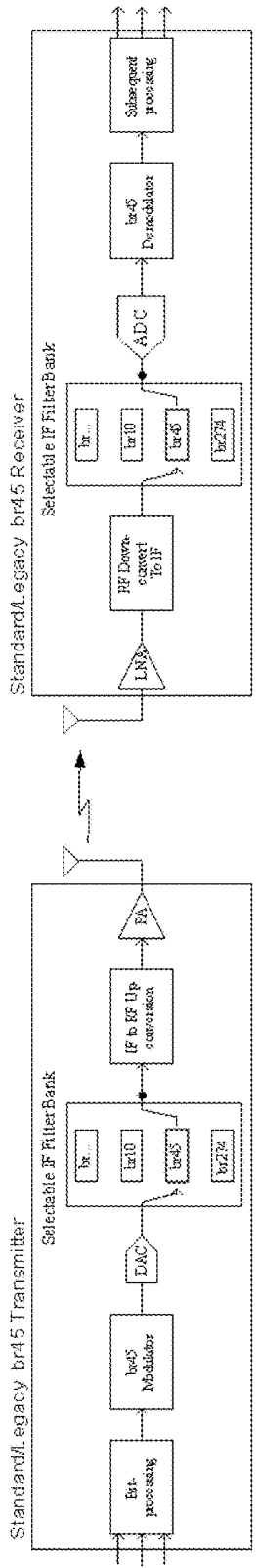
FIG. 4 shows a quad band relay example in accordance with an embodiment of the invention.

In FIG. 4, performance and implementation details are proportionally identical between br10.71 and br45 upgraded systems. Infrastructure discussion is limited to system-level hardware functions and the DSP blocks needed for modulation and demodulation of CDL waveforms. These basic CDL transmitter and receiver blocks are illustrated in FIG. 4. The left most block, the bit processing block, is assumed to completely manage all binary operations preceding modulation—multiplexing, error correction coding, synchronization bit insertion, cryptography, etc. Next, the modulator shapes the binary stream into a complex OQPSK waveform. The waveform may be complex baseband centered, or digitally up-converted to a complex IF when presented to the DAC. The DAC converts the digital waveform into an analog signal to be filtered by a software selectable filter bank for image rejection and, in some cases, additional shaping of the waveform. Finally the signal is up-converted to Ku-band, amplified, and radiated into the air interface. The receiver performs complementary operations: amplification, down-conversion, filtering, digitization and demodulation, followed by bit management. The selectable filter bank consists of several fixed bandwidth filters which can be selected in software, generally as a function of the data rate. These filters remove digital to analog converter spectral images and may contribute additional waveform shaping.

Figure 5:
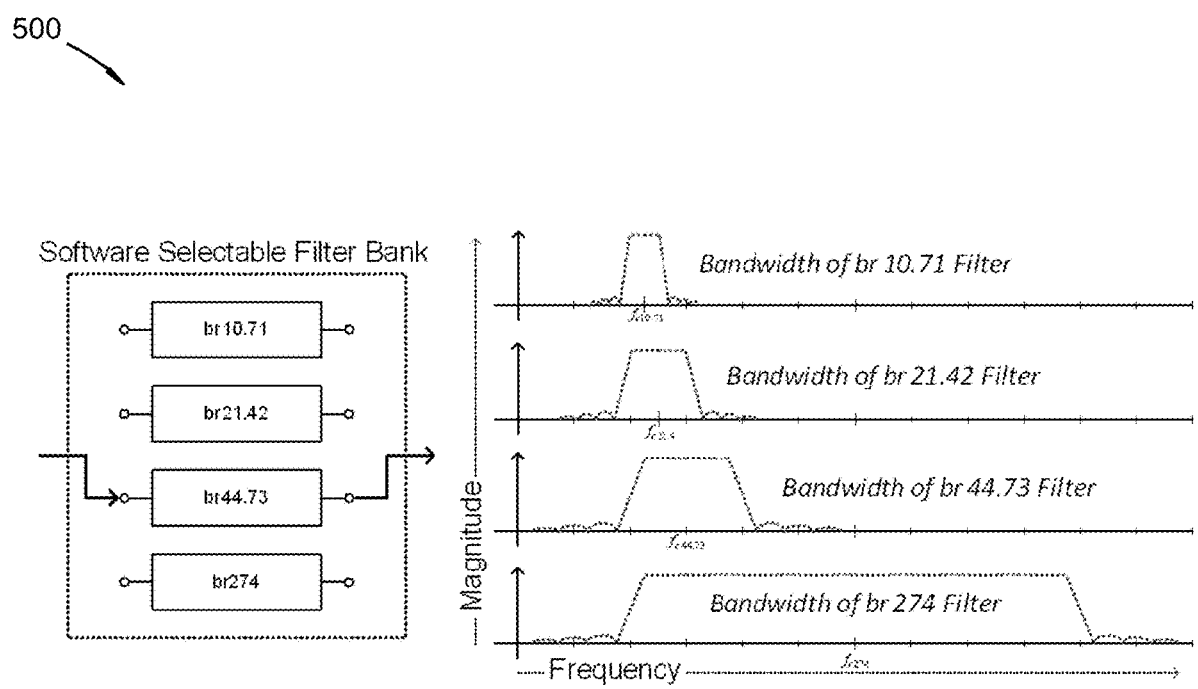
FIG. 5 shows a quad band relay example in accordance with an embodiment of the invention.

In FIG. 5, a simple filter bank can be seen on the left and relative filter bandwidths are illustrated on the right. The function of these filters has changed, but they are generally available in all CDL modems. The key use of such filters in older systems was to shape and bandwidth-limit the signal. This was an essential function when DSP capacity was minimal in the early years of the CDL system. Modern radios are capable of shaping the waveform in the digital domain, and only use the filter banks to remove spectral images resulting from the digital to analog conversion. It is important to note that the spectral images (separated by the sample rate of the DAC) can be moved farther and farther away from the desired signal by increasing the update rate of the DAC. The implication is that a digitally shaped waveform doesn't require a "tight" analog filter for additional analog shaping or bandwidth limiting, if the signal is sufficiently oversampled. For example, a highly oversampled br10.71 waveform may utilize a br274 filter path and completely remove all spectral images. We use this feature to enable the QbR architecture.

Figure 6:
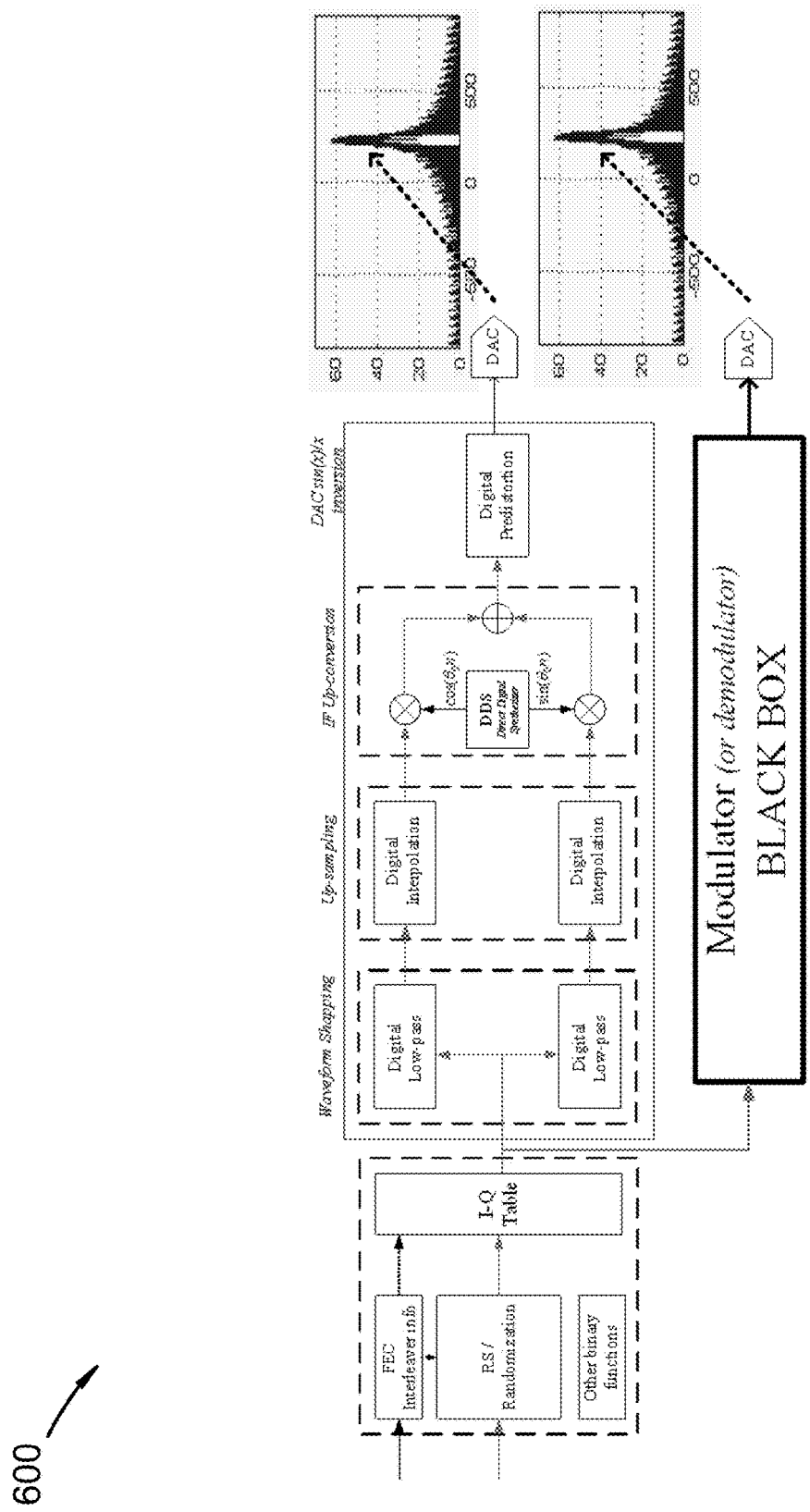
FIG. 6 shows a quad band relay example in accordance with an embodiment of the invention.
Figure 7:
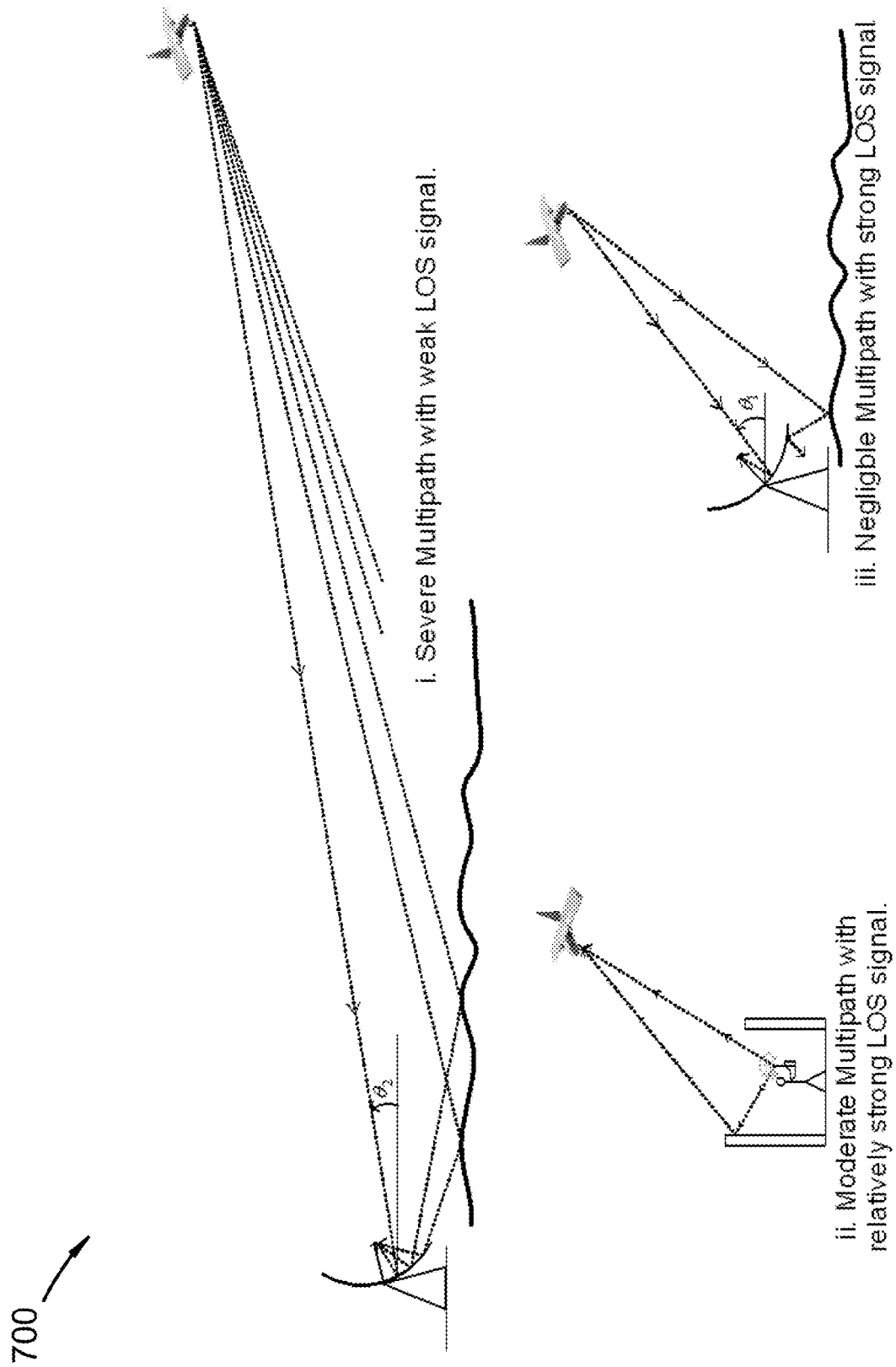
FIG. 7 shows a quad band relay example in accordance with an embodiment of the invention.

In FIG. 6, the modulator and demodulator blocks are treated as "black-box" DSP functions, with a binary data stream input and a continuous band-limited modulated waveform as an output. The binary data provided by the "bit-processing" block is the final result of all digital multiplexing, error coding, randomizing, interleaving, encryption, etc. No additional binary operations are allowed. Similarly, the modulator output to the DAC is assumed to be the final waveform. The modulator (or demodulator) can now be treated as a black box, implying that we can change anything within that box as long as nothing appears to change on the outside. This is the second enabling feature of QbR. Common mission environments are described to better understand the positioning of the link radios and potential physical features and dynamics that effect RF wave propagation.

Three link environments that result in a broad range of channel conditions. Given these link conditions, we describe the potential interference that may result in both static and dynamic channels. A dynamic channel implies at least one of the radios is moving at 50+ kmh. While free space propagation loss is important, we focus instead on multipath losses and fading under these conditions. The losses due to multipath can be significantly mitigated; while free space propagation losses are fixed functions of link separation. The first mission environment has an air-vehicle and a ground unit separated by a large horizontal distance, but both equipped with directional antennas. The second mission configuration is between an air vehicle and a ground unit, neither have directional antennas. Finally, the third arrangement is between the same air and ground entities of example 1, but the horizontal separation is small.

Multipath: When a transmitted signal arrives at a receiver by more than one single path, the resulting composite signal is a multipath signal. The severity of multipath depends on the relative magnitudes, phases, and quantity of the received signals. The severity of multipath interference and fading increases quickly as the geometric link separation increases, and the RF path's relative angles of arrival (AoA) decrease.

Figure 8:
FIG. 8 shows a quad band relay example in accordance with an embodiment of the invention.

FIG. 8 illustrates the AoA decrease ( ) as the link separation increases (horizontally). This condition often results in multiple beam paths combining at the Rx antenna with very small relative amplitude differences, but significant phase shifts. Thus, as free-space propagation losses worsen, multipath interference and fading severity peaks. Multipath interference mitigation techniques: Adaptive equalization and increased transmit power (link margin) are common techniques to reduce the impact of mild multipath interference. These solutions are effective if the channel is static, or changes very slowly; however, for the air-ground mission conditions we are considering, the channel is changing very fast. Adaptive equalization is effective for slowly varying channel conditions; however, the significant rate of variation of air-ship multipath components, (interaction of incident paths, their relative phases, and amplitudes) make adaptive equalization essentially useless in the dynamic multipath environment associated with small AoA link conditions. Common mission environments are described to better understand the positioning of the link radios and potential physical features and dynamics that effect RF wave propagation. We describe three link environments that result in a broad range of channel conditions. Given these link conditions, we describe the potential interference that may result in both static and dynamic channels. A dynamic channel implies at least one of the radios is moving at 50+ kmh. While free space propagation loss is important, we focus instead on multipath losses and fading under these conditions. The losses due to multipath can be significantly mitigated; while free space propagation losses are fixed functions of link separation.

In FIG. 8, the Angle of Arrival decreases as link separation increases. Smaller AoA increase multipath interference. Multipath interference mitigation techniques: Adaptive equalization and increased transmit power (link margin) are common techniques to reduce the impact of mild multipath interference. These solutions are effective if the channel is static, or changes very slowly; however, for the air-ground mission conditions we are considering, the channel is changing very fast.

Adaptive equalization is effective for slowly varying channel conditions; however, the significant rate of variation of air-ship multipath components, (interaction of incident paths, their relative phases, and amplitudes) make adaptive equalization essentially useless in the dynamic multipath environment associated with small AoA link conditions.

Figure 9:
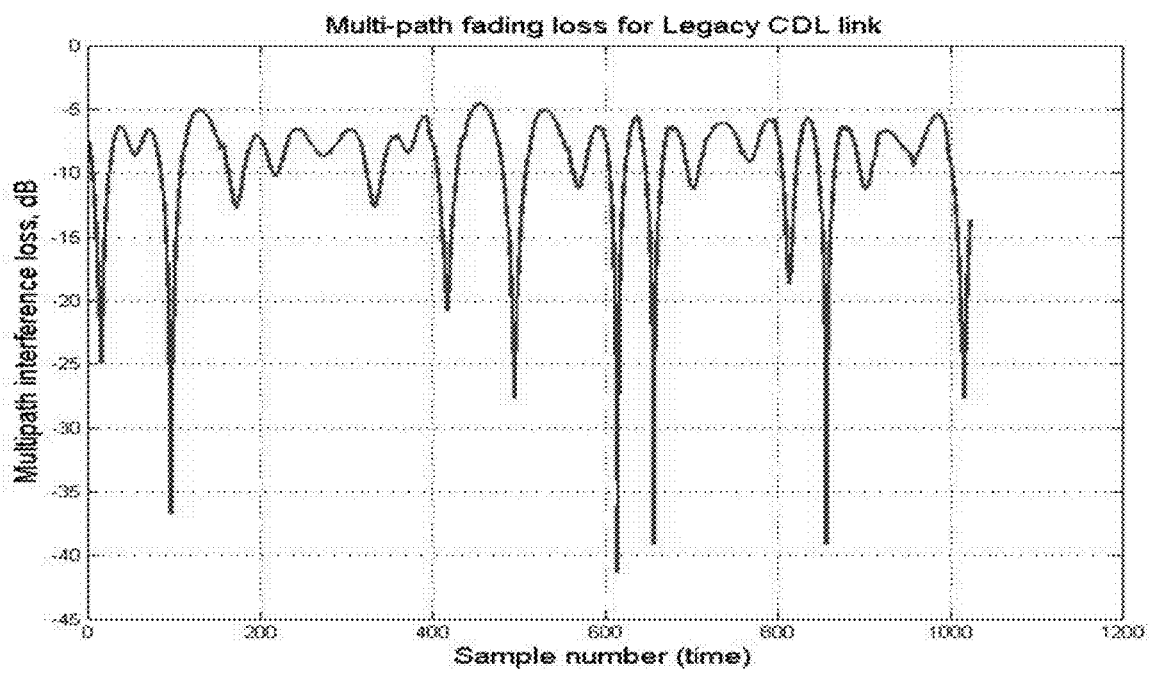
FIG. 9 shows a quad band relay example in accordance with an embodiment of the invention.

In FIG. 9, a simple br45 fade profile with 3 reflected paths, resulting in 35 dB+ nulls. Equal-power QbR diversity provides the same link gain with an additional 20 dB+ power margin compared to a legacy system.

Figure 10:
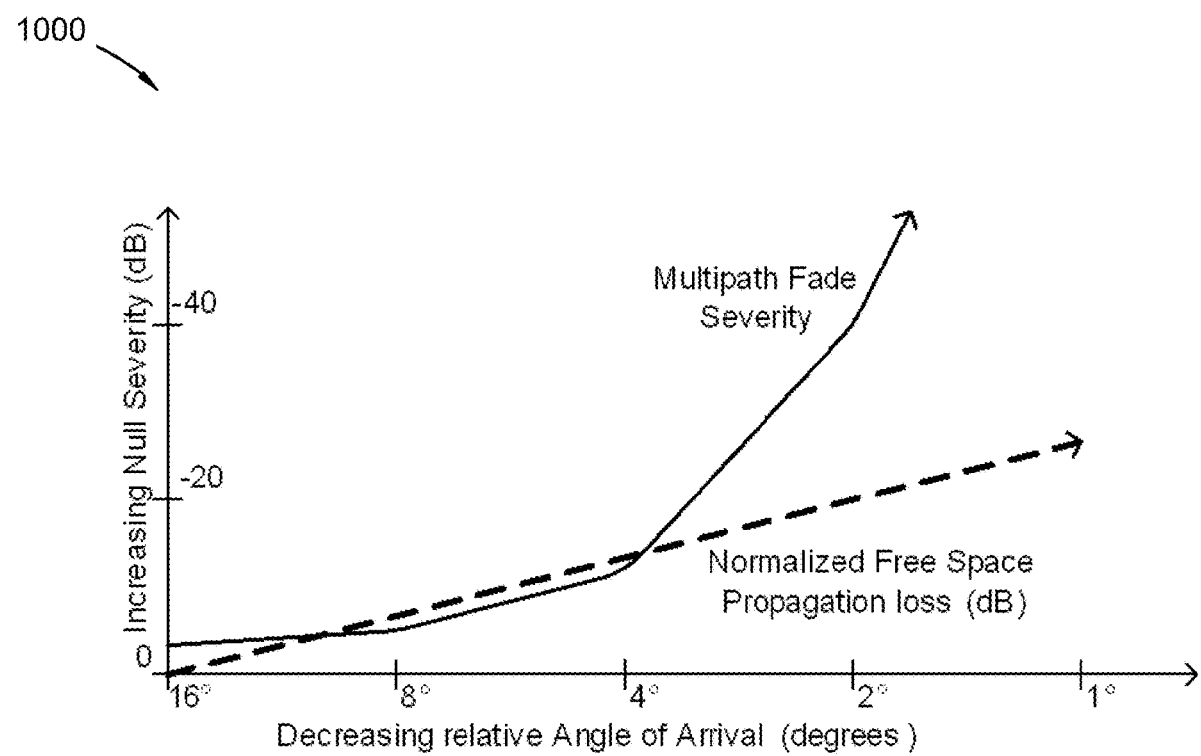
FIG. 10 shows a quad band relay example in accordance with an embodiment of the invention.
Figure 11:
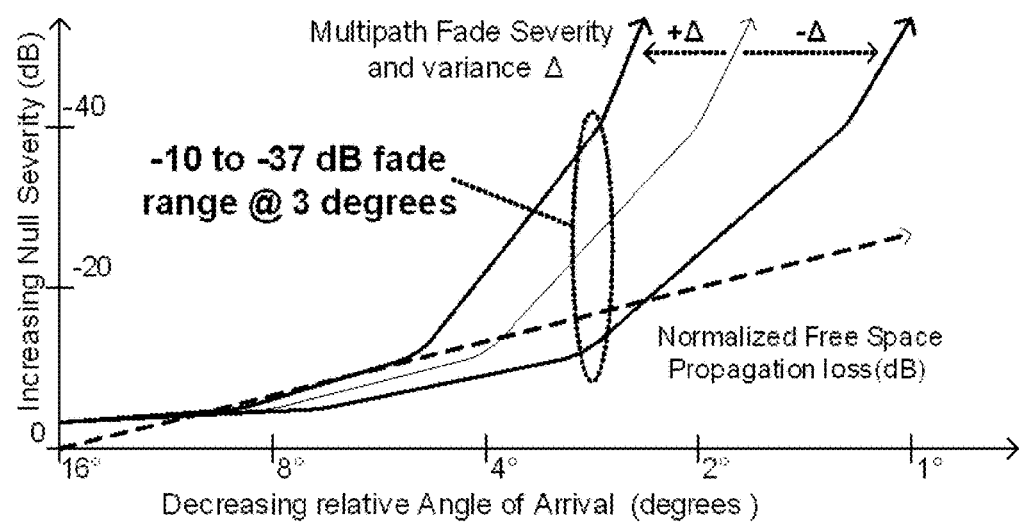
FIG. 11 shows a quad band relay example in accordance with an embodiment of the invention.

FIG. 10 illustrates fade depths of 40+ dB. Also, FIG. 11 provides insight as to the variance of the fade depths, which is an important consideration as the link margin should cover the most severe fading, which is up to 20+ dB additional margin. Asking 60 dB power increase out of a PA is not realistic. This topic is discussed in detail in reports 2 and 3, with hardware results in report-4.

FIG. 10 shows a multipath fade severity and free space propagation losses vs. decreasing AoA.

FIG. 11 shows a multipath fade variance with decreasing AoA. The problem is how to improve CDL performance and reliability, while maintaining legacy compatibility. Maintaining legacy compatibility prohibits any potential binary coding gains, particularly in the case of encrypted transmissions. Furthermore, the waveforms are strictly-defined, eliminating more efficient or robust alternatives. For our solution to be truly useful, simultaneous legacy and diversity mode communications should be supported. Finally, the new architecture must fit within a majority of current hardware links, already in the field, with only a firmware upgrade. In summary the problems addressed, which must ALL be solved simultaneously, are: Mitigate the effects of multi-path fading and interference; maintain 100% legacy compatibility; and support simultaneous legacy and diversity (QbR) communications.

Figure 12:
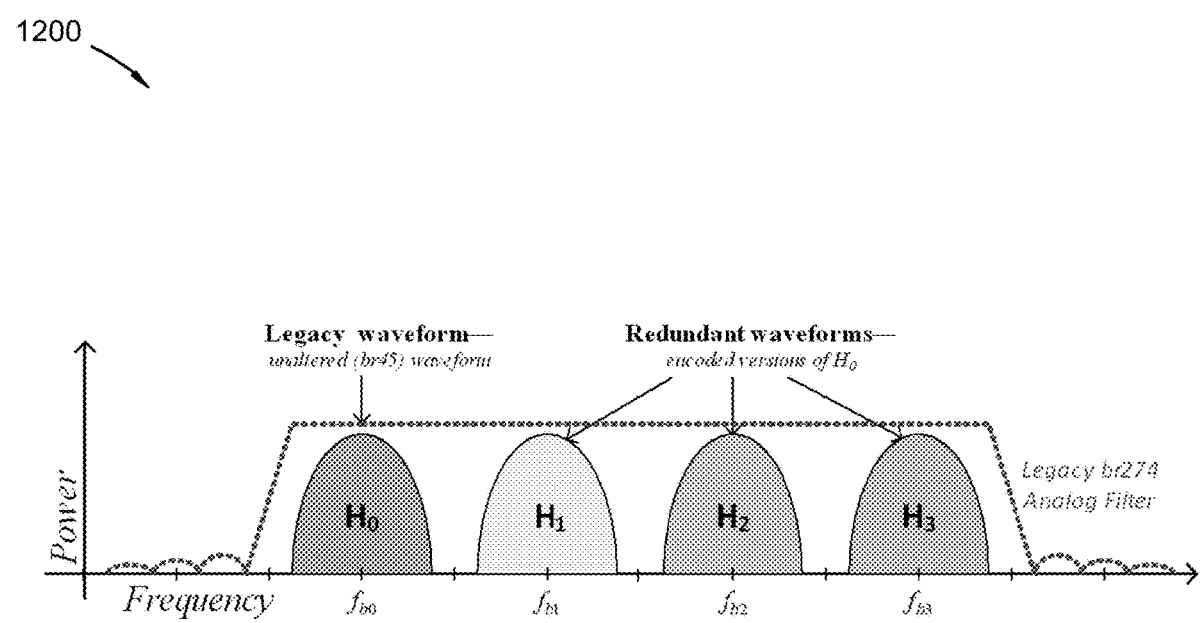
FIG. 12 shows a quad band relay example in accordance with an embodiment of the invention.

Frequency diversity is used to increase the number of independent links "seen" by a Quad band Relay upgraded receiver. Quad band Relay utilizes available CDL bandwidth for diversity transmission of multiple legacy waveforms. In FIG. 12, the power spectrum H0 centered at fb0, represents a legacy br45 waveform. The neighboring bandwidth is populated with 3 encoded versions of the legacy waveform—H1, H2, and H3. This bandwidth is generally unoccupied during legacy br45 operation; however, QbR utilizes this bandwidth to achieve diversity gain by modulating and channelizing (or up-converting) redundant versions of H0. The four spectrally offset waveforms now span the br274 filter bandwidth, with band centers—fb0, fb1, fb2, and fb3.

In FIG. 12, the QbR spectrum consists of FOUR br45 waveforms. Legacy spectral compatibility is still maintained, even though FIG. 12 appears to violate CDL waveform specifications. It is true that the waveform of FIG. 12 appears incorrect; however, when this waveform is subsequently received by a legacy receiver, the receiver "sees" only the spectrum passed by the selected filter, as illustrated in FIG. 5. The br45 filter path would be selected and the resultant digitized spectrum seen inside the modem would appear, and would be, 100% legacy compliant.

Figure 13:
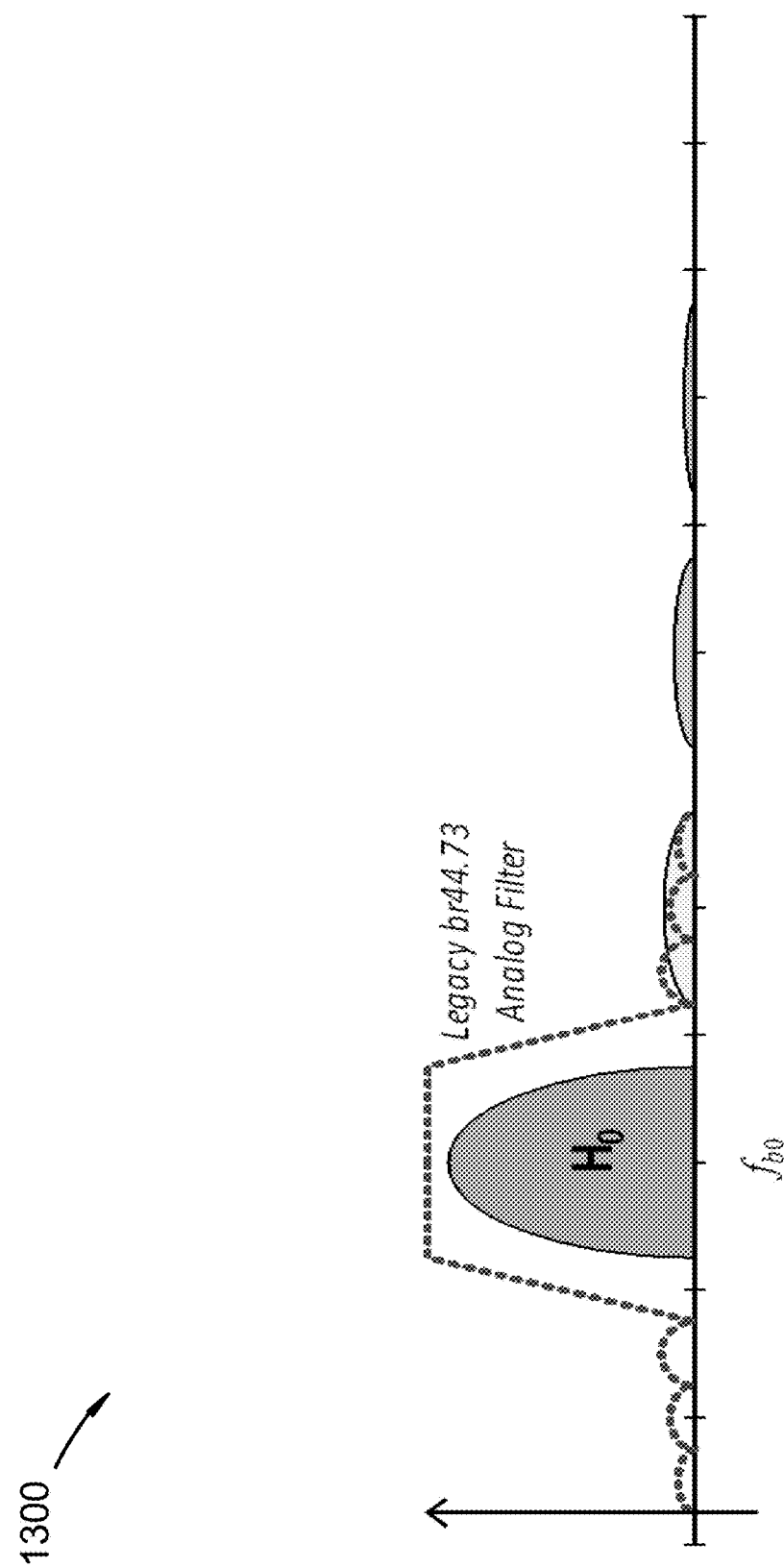
FIG. 13 shows a quad band relay example in accordance with an embodiment of the invention.

FIG. 13 shows post br45 filtering results in a single legacy waveform. Legacy and QbR upgraded CDL systems interoperate seamlessly. The DSP functions that convert legacy CDL into QbR CDL are contained within the FPGA. The neighboring waveforms are rejected by the br45 filter stopband, as shown.

Figure 14:
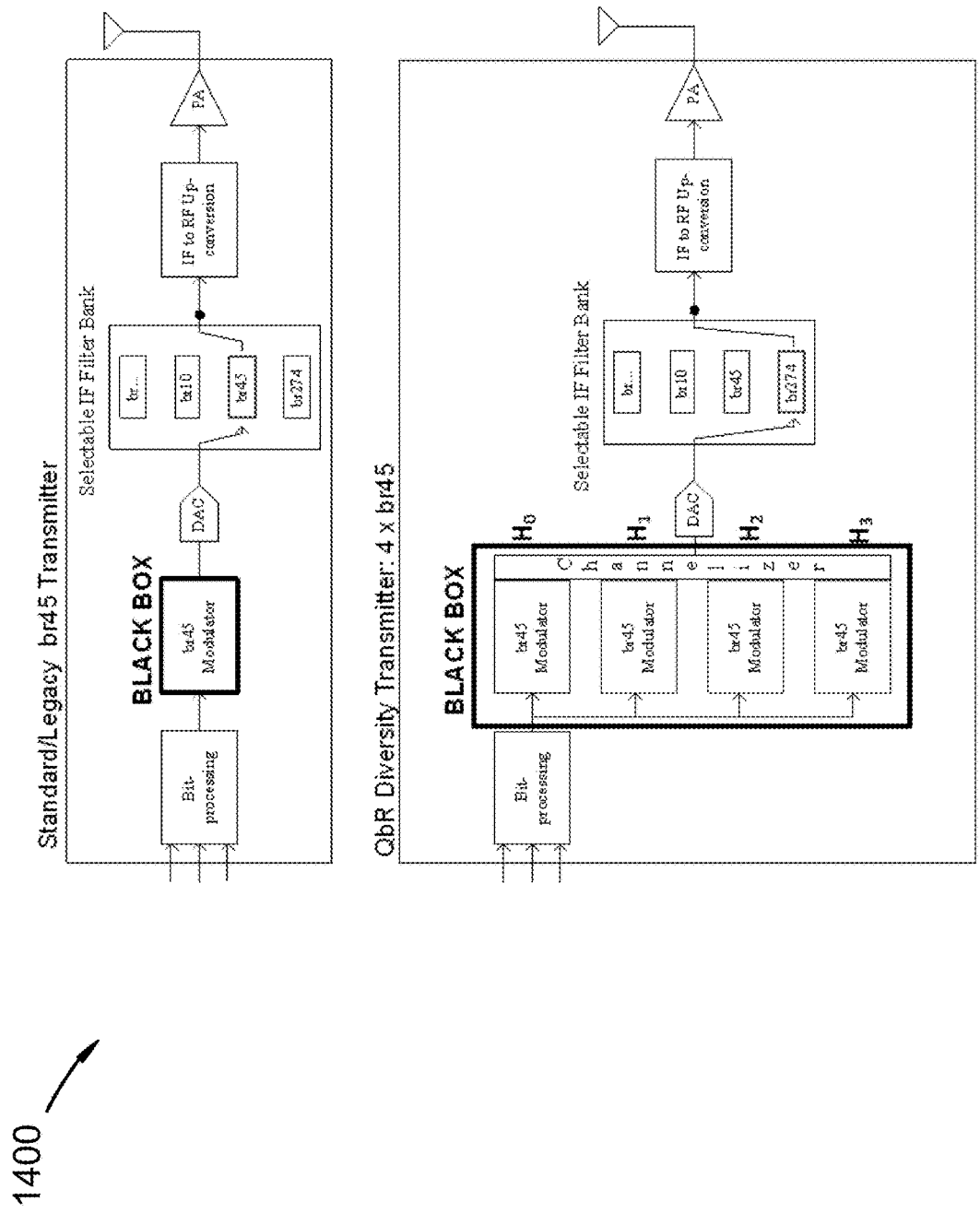
FIG. 14 shows a quad band relay example in accordance with an embodiment of the invention.

FIG. 14 illustrates the additional DSP modulators that convert a legacy CDL transmitter into a QbR CDL transmitter.

We next logically verify the various combinations of QbR and legacy radios that may be on either side of a link at any given time. All potential combinations must maintain legacy compatibility and simultaneously allow diversity gain. We analyze the various arrangements by including the corresponding spectra seen just after the selectable filter bank.

Figure 15:
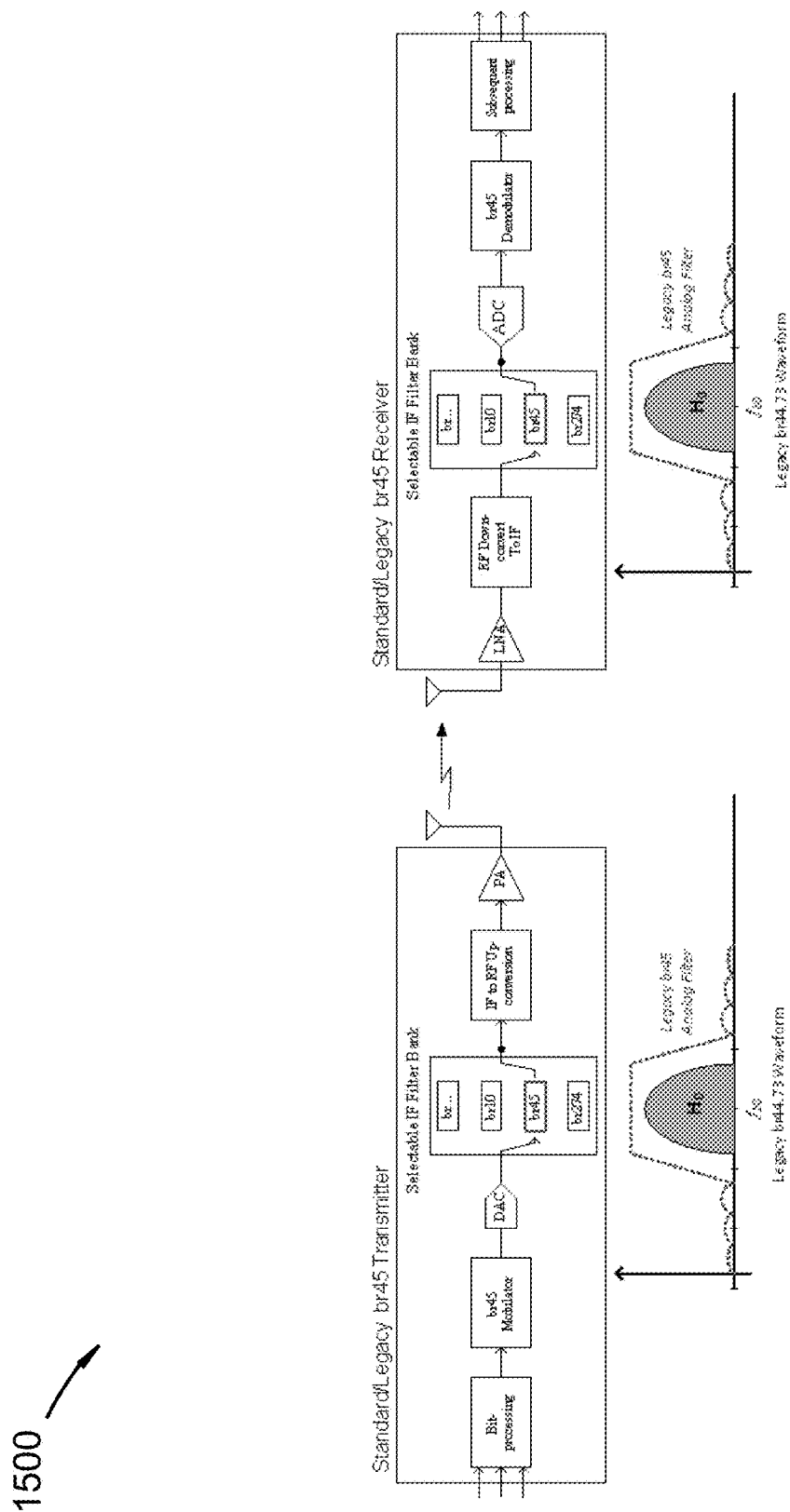
FIG. 15 shows a quad band relay example in accordance with an embodiment of the invention.

FIG. 15 illustrates a simplified br45 transmission, and the time baseband time series. The modulated waveform is transmitted out of the br45 filter-bank, up-converted to RF and radiated via a high-power amplifier and antenna. That transmission is received in a like manner, via a LNA, down-converter and filtered by the br45 receive analog filter.

FIG. 15 shows a standard br45 transmitter and receiver blocks and respective waveforms (H0) The simple functions of FIG. 15 are extended to form the QbR architecture by utilizing 3 additional modulators to transmit on 3 additional subcarriers. Note that these additional DSP functions are wholly confined to the FPGA domain.

Figure 16:
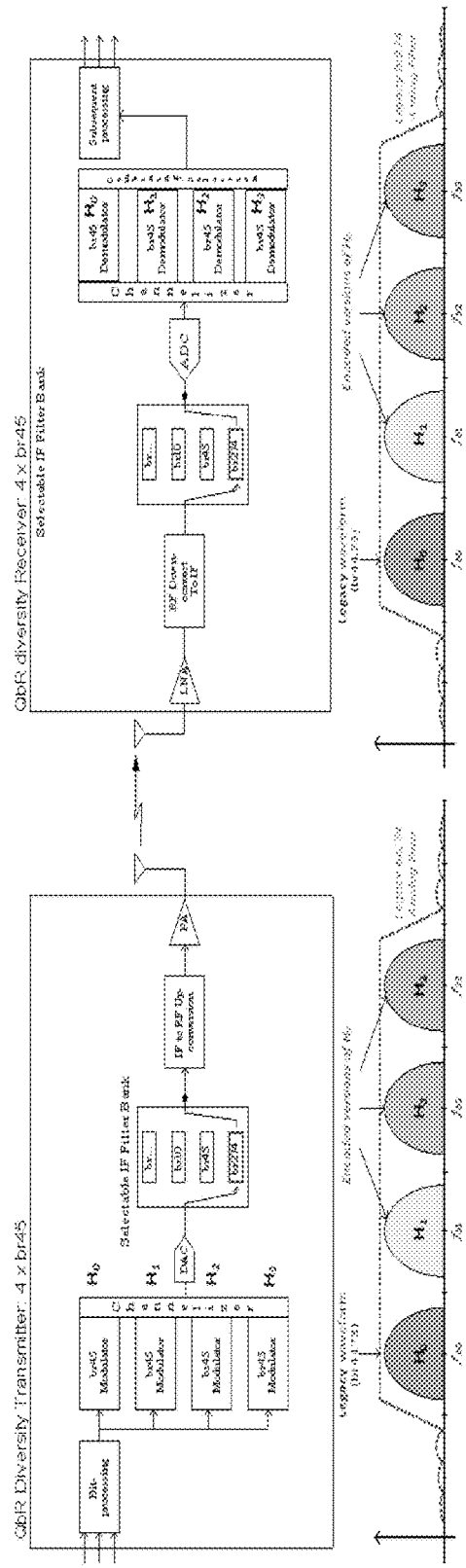
FIG. 16 shows a quad band relay example in accordance with an embodiment of the invention.

FIG. 16 illustrates this operation for a QbR transmitter and receiver. In hardware, the only distinguishing variation (from br45 in FIG. 15) is the selection of the br274 filter path, instead of the usual br45 path. This selection is made in software via a command to the RF switches to route the analog signal to a particular filter.

FIG. 16 shows QbR diversity transmit and receive blocks and spectrum. We now see the transmit channel modulating the waveform H0, and three additional br45 modulations offset to neighboring channels. The composite QbR waveform now propagates the wider bandwidth br274 filter path. Similarly, the QbR receiver selects the same br274 filter path, and demodulates four independent br45 waveforms. The multi-channel frequency offsets are achieved via efficient channelizer architectures. The channelization architecture is discussed in report-2. We now consider a QbR transmitter and legacy CDL receiver. The QbR radiates 4 waveforms; however, the receiver is expecting only one—H0. Fortunately, when the QbR waveforms are received and down-converted, the br45 filter path rejects the out-of-band waveforms. The digital demodulator is completely unaware of signal composition prior to the br45 filter.

Figure 17:
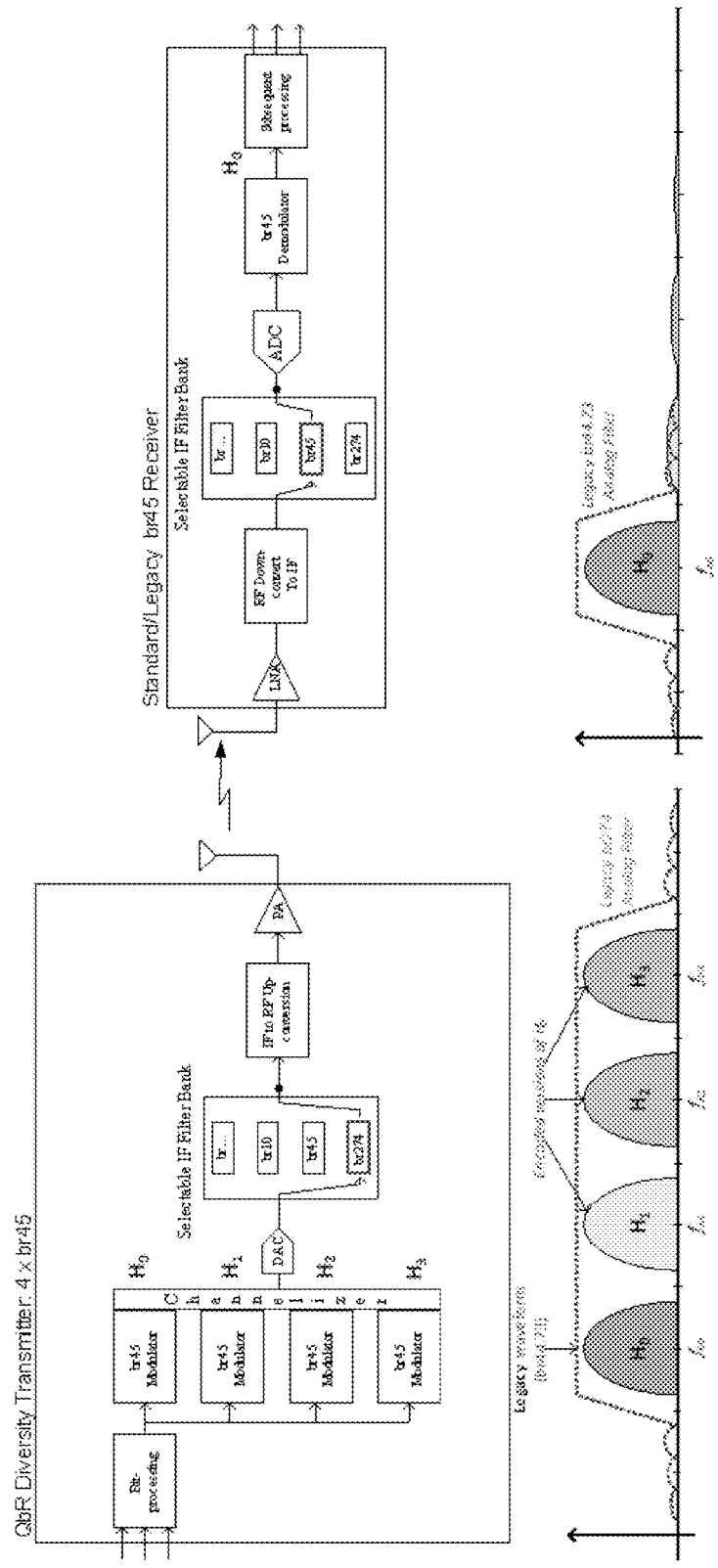
FIG. 17 shows a quad band relay example in accordance with an embodiment of the invention.
Figure 18:
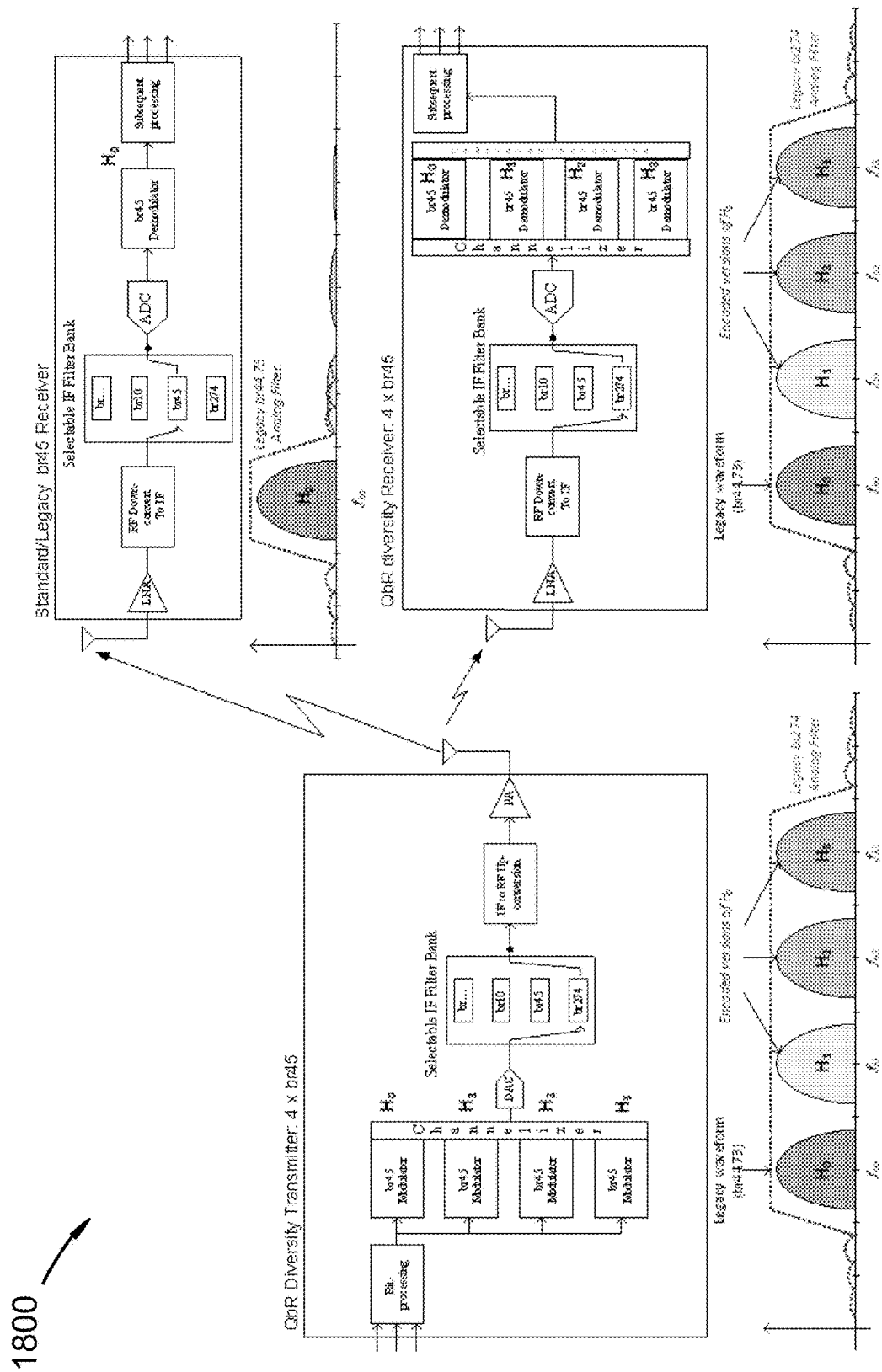
FIG. 18 shows a quad band relay example in accordance with an embodiment of the invention.

FIG. 17 illustrates this architecture and spectral composition. FIG. 17 QbR diversity transmit and legacy receive blocks and spectrum Another common mode is when a QbR receiver demodulates a legacy transmission. In this case the anticipated redundant waveform will be absent. The QbR receiver simply selects H0 as the optimal channel (since H1-H3 are absent). QbR systems do not require additional information beyond that available to legacy systems. Finally, simultaneous operation of QbR and legacy systems is illustrated in FIG. 18. The presence of the transmitted QbR waveform is useful to QbR receivers, but irrelevant to legacy receivers.

FIG. 18 shows QbR diversity transmit and both QbR and legacy receivers mission environments analysis: The improvements QbR diversity achieves versus standard CDL are analyzed (see Results section) in three common air-to-ship mission environments, detailed below and illustrated in.

Figure 19:
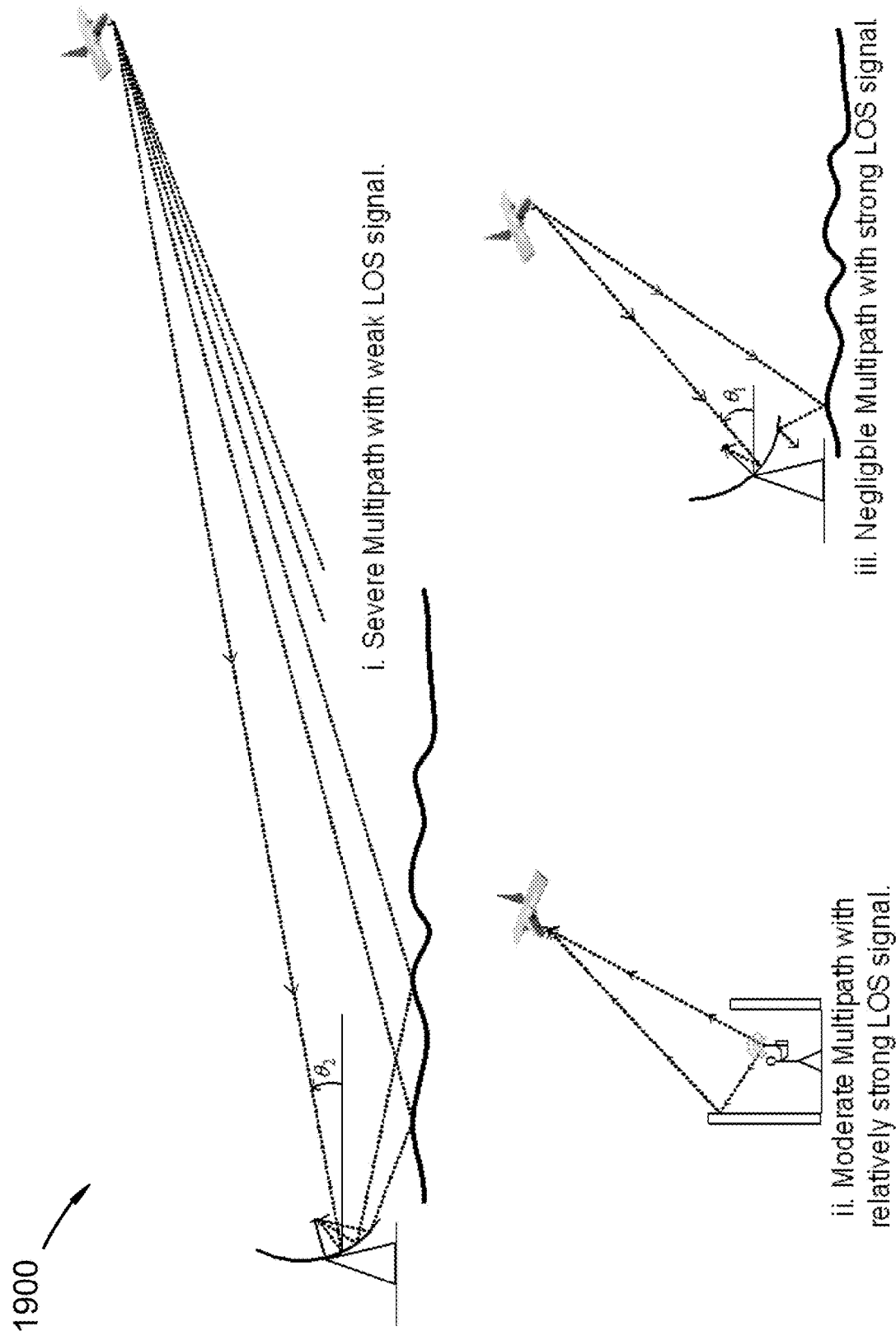
FIG. 19 shows a quad band relay example in accordance with an embodiment of the invention.

In FIG. 19, severe multipath with weak line-of-sight path (LOS). This is common at a ground terminal when the link separation is greatest and the angle of arrival (AoA) is small. Moderate multipath with relatively strong LOS path. This is often the case at an airborne receiver when the ground-unit's transmit antenna has poor directionality. Negligible multipath and strong LOS signal. This is often the case at an airborne receiver when the ground-unit has a highly directional antenna, and/or has a large AoA. Also common at the ground terminal when the AoA is large and the ground terminal antenna has good directionality.

The systems and methods disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of increasing reliability of a wireless radio communication system comprising:
creating a first waveform at a first center frequency $f_0$ of an encoded data stream using a first wireless radio;
creating a second waveform at a second center frequency $f_1$ of the encoded data stream using the first wireless radio;
creating a third waveform at a third center frequency $f_2$ of the encoded data stream using the first wireless radio;
creating a fourth waveform at a fourth center frequency $f_3$ of the encoded data stream using the first wireless radio;
combining the first waveform, the second waveform, the third waveform, and the fourth waveform into a composite waveform with redundant data streams at different center frequencies using the first wireless radio;
wirelessly transmitting the composite waveform using the first wireless radio;
wirelessly receiving the composite waveform with a second wireless radio;
filtering the received composite waveform using a first filter band with the second wireless radio;
digitizing the received composite waveform using the second wireless radio;
demodulating the digitized composite waveform into a first data stream, a second data stream, a third data stream, and a fourth data stream with the second wireless radio;
creating a final data stream representative of the encoded data stream using a combination of two or more of the first data stream, the second data stream, the third data stream, or the fourth data stream using the second wireless radio;
wirelessly receiving the encoded data stream with a third wireless radio using a second filter band that is a subset of the first filter band; and
decoding the encoded data without using the first filter band.

2. The method of claim 1 further comprising: subjecting the second wireless radio and the third wireless radio to multipath interference signals, low angle of arrival signals, and/or jamming signals to jam the encoded signal of the third wireless radio without jamming the encoded signal of the second wireless radio.

3. The method of claim 1 further comprising: determining a line-of-sight condition for the third wireless radio and the second wireless radio.

4. The method of claim 3 further comprising: choosing a specific satellite or aerial transmitter as the first wireless radio based on the determined line-of-sight conditions.

5. The method of claim 4, wherein the specific satellite or aerial transmitter is chosen to keep the third wireless radio from receiving and decoding the encoded data stream.

6. The method of claim 4, wherein the specific satellite or aerial transmitter is chosen to allow both of the third wireless radio and the second wireless radio to receive and decode the encoded data stream.

* * * * *